2,292,399

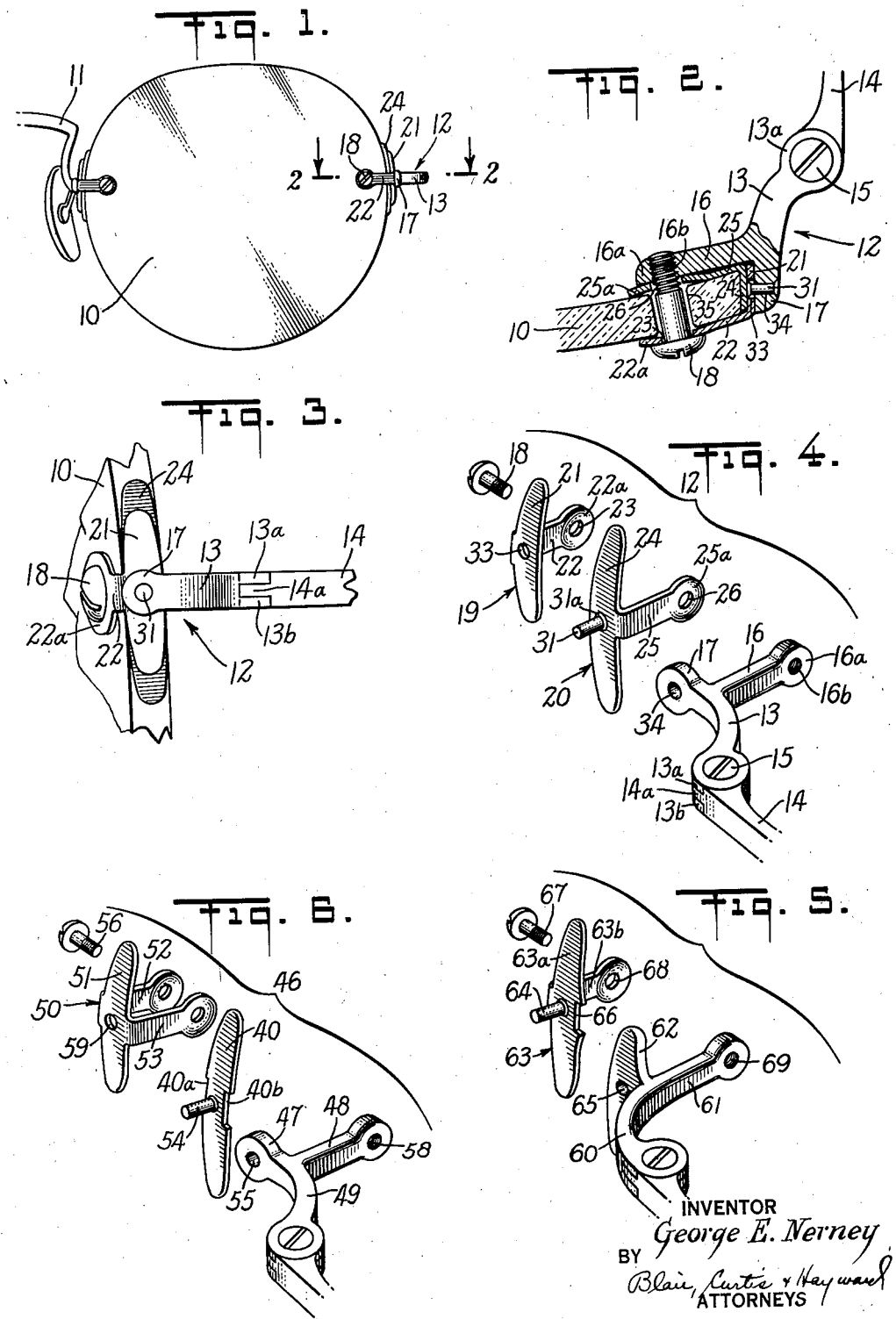
Aug. 11, 1942.   G. E. NERNEY   2,292,399
EYEGLASS CONSTRUCTION
Filed March 5, 1940
INVENTOR
George E. Nerney
BY Blair, Curtis & Hayward
ATTORNEYS Patented Aug. 11, 1942

UNITED STATES PATENT OFFICE 2,292,399

EYEGLASS CONSTRUCTION

George E. Nerney, Attleboro, Mass., assignor to Bay State Optical Company, Attleboro, Mass., a corporation of Maine Application March 5, 1940, Serial No. 322,278

5 Claims. (Cl. 88—47)

This invention relates to rimless eyeglass construction.

One of the objects of this invention is to provide an eyeglass construction which will be simple, practical, and thoroughly durable. Another object is to provide a construction of the above character which may be easily manufactured with a minimum of labor and from inexpensive materials. Another object is to provide a construction of the above character which will be neat and attractive in appearance. Another object is to provide a construction of the above character which will be an additional safeguard against loosening and thus against lens breakage. Another object is to provide a construction of the above character in which the lens and end piece may be assembled with ease and facility. Another object is to provide a construction of the above character in which there is a snug fit between the lens and the parts connected thereto. Other objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawing in which are shown some of the various possible embodiments of my invention, Figure 1 is a front elevation of an eyeglass lens having the preferred embodiment of my end piece construction applied thereto;

Figure 2 is a horizontal view, partly in section and on an enlarged scale, taken along line 2—2 of Figure 1;

Figure 3 is a side elevation, on an enlarged scale, of a portion of the construction shown in Figure 1;

Figure 4 is an exploded perspective view, on an enlarged scale, of the end piece shown in Figure 1;

Figure 5 is an exploded perspective view on an enlarged scale of a modification of the end piece shown in Figure 1; and Figure 6 is an exploded perspective view, on an enlarged scale, of another modification of the end piece construction shown in Figure 1.

Similar reference characters refer to similar parts throughout the several views of the drawing.

In order that certain features of this invention may be better understood, it might here be pointed out that various difficulties have been encountered in attempting to achieve a reliable and durable connection between a fitting, such as an end piece, and a lens. This is particularly true in rimless mountings, which are fragile at the point of connection of the end pieces to the lenses, as the lenses lack rim support. These end pieces are usually connected to the lens by ears having a screw or the like passing through them and the lens. After continued use, pivotal movement of the fittings about the screw loosens the connection. This loosening causes both uneven tensioning and a striking action by the lens screw within the lens hole, which, in turn, often causes the portion of the lens between the screw hole and the edge to break out, necessitating replacement of the lens.

A further difficulty is experienced in making the ears of the end piece conform to the curvature of the lens. As is well known, the curvature in lenses varies considerably, and the retailer usually bends the ears with pliers to make them conform to the curvature of the lens. Due to the small size of the parts, it is a difficult job to make a perfect connection between the end piece and the lens. One of the objects of this invention is to provide a construction in which the several difficulties hereinabove mentioned, as well as many others, are successfully overcome.

Referring now to Figure 1 of the drawing in detail, a lens 10 is shown having secured thereto a bridge fitting 11 and an end piece fitting generally indicated at 12. The lens-connecting portions of fittings 11 and 12 are substantially similar, and for the present purposes, the details of construction will be discussed only with respect to fitting 12.

As best shown in Figures 2 and 3, end piece fitting 12 comprises an end piece 13, an arm 16, and an abutment 17. End piece 13 is hingedly connected to a temple 14 by ears 13a, 13b, and 14a (Figure 3), through which screw 15 (Figure 2) passes. Arm 16 extends inwardly over the inner surface of lens 10 and terminates in an enlarged portion 16a (Figure 4), which is suitably bored for the reception of a screw 18 for purposes to be disclosed more fully hereinafter.

Abutment 17 extends over the edge of lens 10, as may be best seen in Figure 2, and serves as the base to which are secured a pair of resilient sheet metal saddle fittings, generally indicated at 19 and 20 (Figure 4). Saddle fitting 19 comprises a leaf spring section 21 having an integral ear 22 formed thereon which terminates in an enlarged portion 22a. Enlarged portion 22a is cup-shaped and has a hole 23 therein for purposes to be described more fully hereinafter. Saddle fitting 20 is substantially similar in construction to saddle fitting 19 and comprises a leaf spring section 24, ear 25, and enlarged portion 25a, which is also cup-shaped and has a hole 26 therein. However, fittings 19 and 20 differ in that ears 22 and 25 extend downwardly from opposite edges of their respective spring sections, as may be seen in Figure 4, and leaf spring section 21 is preferably shorter than leaf spring section 24.

As best seen in Figures 2 and 4, a rivet 31 is provided having an enlarged end 31a which is welded or soldered to the center of leaf spring 24. Abutment 17 and leaf spring 21 have holes 33 and 34 formed therein at their centers, and these holes are preferably counterbored on the under surface of the leaf spring 21 and the outer surface of abutment 17 for purposes to be described more fully hereinafter. In assembly, when fitting 12 is secured to lens 10, ear 25 of saddle fitting 20 lies adjacent arm 16 and abuts against the rear surface of lens 10, and leaf spring 21 of saddle fitting 19 surmounts leaf spring 24 with ear 22 extending over the front surface of lens 10.

Rivet 31 extends throughout the holes of leaf spring 21 and abutment 17, and its enlarged end 31a fits within the counterbored portion of hole 33 in leaf spring 21. The outer end of rivet 31 is headed over into the counterbored portion of hole 34 in abutment 17. Thus rivet 31 securely fastens saddle fittings 19 and 20 to end piece 13, and ears 22 and 25 are held in alignment with arm 16, and thus with each other.

Lens 10 has a hole 35 (Figure 2) therein which, when the fitting is in position, is in alignment with the holes in ears 22 and 25 and the threaded hole 16b in the enlarged portion 16a of arm 16. Screw 18 extends through these holes and is threaded into hole 16b. As screw 18 is tightened, its head presses inwardly on the cup-shaped end 22a of ear 22 of saddle fitting 19 and draws it inwardly, making the periphery of the cup-shaped portion and ear 22 conform to the curvature of the front surface of the lens. Furthermore, the resiliency of ear 25 permits it to automatically adjust itself and its cup-shaped end 25a to the curvature of the rear surface of the lens.

It should be noted that lens hole 35 (Figure 2) is of a greater diameter than the body of screw 18. Thus, when end piece 13 is in position, with screw 18 set, the screw does not directly contact the lens, the lens being clamped between the substantially circular peripheries of the cup-shaped ends 22a and 25a of ears 22 and 25 respectively. As these cup-shaped portions are resilient at their centers they continually press away from the lens, exerting a resilient force against the head of screw 18. This force prevents the rotation and resultant loosening of the screw, which, as has been pointed out above, is the action which precedes a very prevalent cause of lens breakage. Furthermore, because the cup-shaped ends contact the lens at their peripheries, even tensioning upon the surfaces of the lens results when the screw is tightened. Further, a type of end piece is disclosed in which the ears automatically adjust themselves to the curvature of the lens and in which an uneven tensioning of the ears upon the surfaces of the lens is prevented.

When fitting 12 is attached to the lens, leaf spring 24 can contact the lens throughout its entire length, which permits the fitting to be connected with a secure and durable connection to lenses having a variety of different curvatures in their edges. Further, when rivet 31 is welded in position the welding operation may be used to draw the temper from the center of leaf spring 24. Thus, the ear on the leaf spring may be readily bent to the proper position. Leaf spring 21 fits tightly against this center portion of the leaf spring 24 so that drawing the temper in this manner does not interfere with the proper functioning of the end piece.

Another feature which assists in making this a strong and durable connection is the fact that the heavy arm 16 extends over the rear surface of the lens. As is well known, the curvature of the rear surface of all lenses is fairly uniform and constant. Accordingly, this arm is given the proper curvature when made. Thus it is not necessary for the retailer to alter its shape. The arm and ears 22 and 25 automatically follow the curvature of the lens as the screw 18 is tightened. Accordingly, a perfect connection may be made by the retailer between the fitting and the lens with a minimum of effort and skill. In other words, this construction eliminates the necessity of the retailer's shaping the ears of a fitting to fit a lens, which, as has been pointed out hereinabove, is difficult and has often led to a connection placing uneven tensioning upon the lens surfaces with resultant breakage at a later date.

Referring now to Figure 5, the fitting shown is a modified form of that disclosed hereinabove. It comprises an end piece 60 having an arm 61 and an abutment 62 formed thereon. The saddle fitting, generally indicated at 63, which comprises a leaf spring section 63a and an ear 63b, is secured to abutment 62 by a rivet 64. This rivet is soldered to the center of the leaf spring and passes through a hole 65 in the abutment 62 and is then headed over. Leaf spring 63a has a notch 66 cut in its edge which, when the saddle fitting is secured to the end piece 60, interlocks with arm 61 to form a secure connection therewith. It should be noted that abutment 62 in this fitting is larger than the abutment on the fitting disclosed hereinabove. This enlarged size serves to materially strengthen the saddle portion of the leaf spring 63a when it is in use in that it supports the section of the spring that is softened by the heat applied to solder rivet 64 thereto.

To secure the fitting to a lens, ear 63b and arm 61 are positioned so that they extend over opposite surfaces of the lens. Screw 67 is then passed through hole 68 in ear 63b and threaded into bore 69 in arm 61. When the screw is tightened, the resilient ear 63b is drawn inwardly and fits itself to the curvature of the front surface of the lens. Thus the fitting is secured to the lens in a strong and durable manner and is provided with a resilient ear which follows and grips with even tensioning lenses having different curvatures.

Referring now to Figure 6, in which is shown another modification of the invention, end piece fitting 46 comprises an end piece 49 with an abutment 47 and an arm 48 formed thereon, a saddle fitting 50, and a leaf spring 40. Saddle fitting 50 comprises a leaf spring section 51, a pair of ears 52 and 53 integral therewith, and has a hole 59 in the center of its leaf spring section. Leaf spring 40, which is larger than leaf spring 51, has a pair of notches 40a and 40b formed in its edges on either side thereof and an outwardly extending rivet 54 is soldered to its center. These notches are of substantially the same width as ears 52 and 53, and the width of leaf spring 40 at the notches is substantially the same as the distance across leaf spring 51 between ears 52 and 53. Thus leaf spring 40 is snugly received between ears 52 and 53 and fits against the inner face of leaf spring 51. In assembly, rivet 54 is passed through hole 59 and headed over in hole 55 in abutment 47 in substantially the same manner as the fitting disclosed in Figures 1 through 4.

When it is desired to attach the fitting to a lens, a screw 56 is passed through ears 52 and 53 and threaded into the bore 58 of arm 48. As the screw is tightened, ears 52 and 53 with their cup-shaped ends adjust themselves to the curvature of the lens surfaces and securely connect the fitting thereto.

Accordingly, it will be seen that I have provided efficient and thoroughly practical constructions in which the several objects hereinabove set forth, in addition to many others, have been successfully accomplished.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In rimless eyeglass construction, in combination, a lens having a lens hole therein, an end piece, a pair of resilient leaf spring members secured to said end piece, said spring members being placed in surmounted relationship on the edge of said lens, said members extending outwardly from each side of said end piece, a single integral resilient ear formed on each of said spring members, said ears extending over opposite sides of said lens, and securing means extending through said lens hole and said ears to secure said lens to said end piece.

2. In rimless eyeglass construction, in combination, a lens having a lens hole therein, an end piece, an arm formed on said end piece extending over a surface of said lens, an abutment formed on said end piece extending over the edge of said lens, a pair of resilient spring members secured to said abutment, said spring members being in surmounted relationship and lying between the under surface of said abutment and the edge of said lens, a single integral resilient ear formed on each of said spring members and extending over opposite surfaces of said lens in alignment with said arm, and securing means extending through said lens hole and said ears into said arm to secure said lens to said end piece.

3. In rimless eyeglass construction, in combination, a lens having a lens hole therein, an end piece, an arm formed on said end piece extending over one surface of said lens, a pair of resilient leaf spring members connected in their center portions to said end piece, said resilient members being positioned in surmounted relationship on the edge of said lens, a single integral resilient ear formed on each of said members, said ears extending over opposite surfaces of said lens in alignment with said arm, and securing means extending through said ears and said lens hole into said arm to secure said end piece to said lens.

4. In a saddle for connecting the parts of a rimless frame to a lens, in combination, a lens having a lens hole therein, an arm member extending over one surface of said lens, a pair of resilient leaf spring members, means connecting the center portions of said spring members to said arm member, said leaf spring members being in surmounted relationship on the edge of said lens, a single integral resilient ear formed on each of said spring members and extending over opposite surfaces of said lens in alignment with said arm member, and securing means extending through said lens hole and said ears into said arm member to secure said lens to said endpiece.

5. In rimless eyeglass construction, in combination, a lens having a lens hole therein, an endpiece, an arm formed on said endpiece and extending over a surface of said lens, a pair of resilient leaf spring members connected to said endpiece, said resilient members being positioned in surmounted relationship on the edge of said lens, a single integral resilient ear formed on each of said members, said ears extending over opposite surfaces of said lens in alignment with said arm, the ends of said ears being cup-shaped on their opposing surfaces, the cup-shaped ends of said ears having holes extending therethrough in alignment with each other, and securing means extending through the holes in said ears and said lens hole into said arm to secure said endpiece to said lens.

GEORGE E. NERNEY.